(12) United States Patent
Rosenzweig et al.

(10) Patent No.: US 8,915,979 B2
(45) Date of Patent: Dec. 23, 2014

(54) HYDROGEN GENERATING FUEL CELL CARTRIDGES

(75) Inventors: Alain Rosenzweig, Saint Maur des Fosses (FR); Kurt Rath, Herblay (FR)

(73) Assignee: Societe BIC, Clichy Cedex (FR)

( * ) Notice: Subject to any disclaimer, the term of this patent is extended or adjusted under 35 U.S.C. 154(b) by 782 days.

(21) Appl. No.: 13/121,140

(22) PCT Filed: Sep. 29, 2009

(86) PCT No.: PCT/IB2009/055102
§ 371 (c)(1),
(2), (4) Date: Mar. 25, 2011

(87) PCT Pub. No.: WO2010/035250
PCT Pub. Date: Apr. 1, 2010

(65) Prior Publication Data
US 2011/0176973 A1    Jul. 21, 2011

(51) Int. Cl.
*B01J 7/00*    (2006.01)
(52) U.S. Cl.
USPC ............ 48/61; 48/127.9; 48/127.1; 48/197 R; 423/650; 423/651; 423/652; 423/653; 423/654; 423/644; 423/657; 423/658.2
(58) Field of Classification Search
USPC ............ 48/61, 127.9, 127.1; 423/648.1, 650, 423/651, 652, 653, 654, 644, 657, 658.2
See application file for complete search history.

(56) References Cited

U.S. PATENT DOCUMENTS

| | | | |
|---|---|---|---|
| 7,105,033 B2 * | 9/2006 | Strizki et al. ............ | 48/61 |
| 7,540,892 B2 * | 6/2009 | Strizki et al. ............ | 48/61 |
| 8,636,961 B2 * | 1/2014 | Sgroi et al. ............. | 422/236 |
| 2001/0045364 A1 * | 11/2001 | Hockaday et al. ......... | 205/338 |
| 2004/0148857 A1 * | 8/2004 | Strizki et al. ............ | 48/127.9 |
| 2005/0095481 A1 | 5/2005 | Shibata et al. | |
| 2005/0175868 A1 | 8/2005 | Mcclaine et al. | |
| 2005/0238573 A1 | 10/2005 | Zhang et al. | |
| 2006/0057437 A1 * | 3/2006 | Finkelshtain et al. ....... | 429/12 |
| 2006/0191199 A1 | 8/2006 | Rosenzweig et al. | |
| 2009/0104481 A1 | 4/2009 | Mohring et al. | |
| 2010/0028748 A1 * | 2/2010 | Curello et al. ............ | 429/34 |

FOREIGN PATENT DOCUMENTS

WO    2006135896 A    12/2006
WO    2007120942 A    10/2007

OTHER PUBLICATIONS

International Search Report issued in connection with corresponding International Application No. PCT/IB2009/055102.

* cited by examiner

*Primary Examiner* — Kaity V. Handal
(74) *Attorney, Agent, or Firm* — The H.T. Than Law Group

(57) ABSTRACT

The present application is directed to a gas-generating apparatus. Hydrogen is generated within the gas-generating apparatus and is transported to a fuel cell. The first fuel component is introduced into the second fuel component through a conduit which punctures a septum separating the reaction chamber and the first fuel component reservoir, and the fuel conduit introduces the first fuel component to different portions of the second fuel component to produce hydrogen.

22 Claims, 4 Drawing Sheets

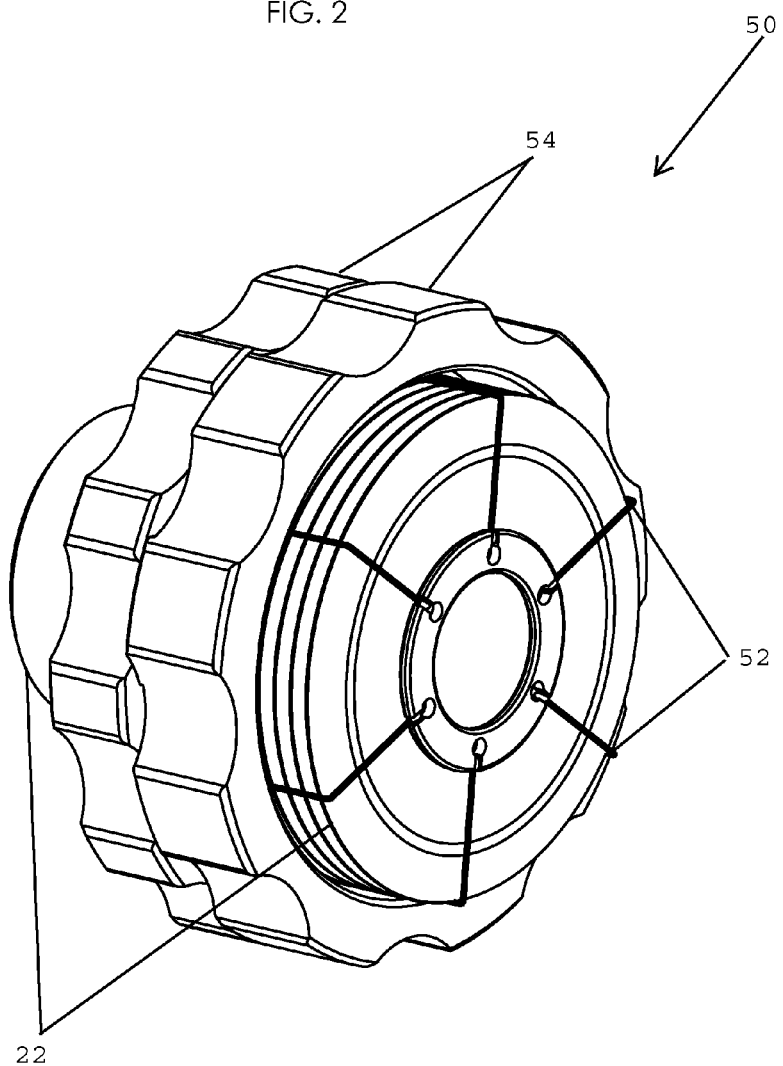

HYDROGEN GENERATING FUEL CELL CARTRIDGES

FIELD OF THE INVENTION

The present application is a U.S. national phase under 35 USC §371 of, and claims priority to international patent application PCT/IB2009/055102 filed on Sep. 29, 2009 and international patent application PCT/IB2009/055102 claims priority to previously filed international patent application PCT/IB2008/055628 filed on 29 Sep. 2008 under PCT Article 8 and PCT Rule 4.10. Both parent applications are incorporated by reference herein in their entireties.

The invention is directed to fuel supplies, fuel cartridges or hydrogen generators for fuel cells.

BACKGROUND OF THE INVENTION

A known challenge in the hydrogen generation art is to control the reaction rate between a chemical metal hydride, such as sodium borohydride, and a liquid, such as water or methanol. When the reaction is too slow, the fuel cell does not have sufficient hydrogen to generate electricity. When the reaction is too fast, the excess hydrogen gas can pressurize the fuel supply or hydrogen generator.

Heretofore, control of the reaction rate to produce hydrogen in a chemical metal hydride reaction has been accomplished by introducing the catalyst into a reaction chamber containing aqueous metal hydride and water to start the reaction and removing the catalyst from the aqueous metal hydride to stop the reaction, as disclosed in U.S. Pat. Nos. 6,939,529 and 3,459,510 and in U.S. Published Patent Application No. US 2005/0158595. This technique regulates the rate of reaction by controlling how much the catalyst interacts with the aqueous fuels or the duration of contact between the catalyst and the fuels.

Another method of controlling the reaction rate is to add metal hydride granules having uniform size into water at a steady rate to control the production of hydrogen, as discussed in U.S. Patent Publication No. US 2004/0184987. Another method is to control the injection rate of water and aqueous metal hydride solution to control their reaction rate.

However, there remains a need for methods and devices that can effectively control the reaction rate between the chemical metal hydride and the liquid reactant.

BRIEF SUMMARY OF THE INVENTION

The present invention is directed toward fuel systems/gas-generating apparatus that include a novel structure of introducing a fluid fuel component into a second fuel component, involving injection tubes piercing a septum and providing moving injection points.

In one embodiment, the present invention relates to a gas-generating apparatus that includes a first fuel container containing a fluid fuel component, such as water or methanol, and a second fuel container separated from the first fuel container by a septum. The second fuel container contains a second fuel component, such as metal hydrides, and the fluid fuel component reacts with the second fuel component to produce hydrogen. A fluid conduit is disposed at least partially within the first fuel container, wherein the fluid conduit pierces the septum separating the first from the second fuel container to form a fluid flow path for introducing the fluid fuel component into the second fuel container. The fluid conduit is movable based at least on a pressure and/or force exerted on the first fuel container, and the movement of the fluid conduit allows the fluid fuel component to be introduced into several locations within the second fuel container. In one embodiment, the fluid conduit comprises a plurality of hollow needles.

To initiate the delivery of the fluid fuel component into the second fuel container an initial force is applied to the fluid conduit to pierce the septum. Preferably, a void, bubble or empty space is provided within the first fuel container, so that the initial force can compress the void, bubble or empty space in order to advance the fluid conduit through the septum. The void, bubble or empty space can be contained within an elastomeric bladder or a flexible liner within the first fuel container or within the container of the fluid fuel component.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 2 is a perspective view of a stop of the fuel supply of FIG. 1A.

DETAILED DESCRIPTION OF THE INVENTION

The present invention is directed toward fuel systems/gas-generating apparatus that include a novel method of introducing a fluid fuel component, such as water and methanol, into a second fuel component, such as a metal hydride, involving a one-shot method of injecting the fluid fuel component into fresh portions of the second fuel component by moving the injection points during injection. Preferably, this is accomplished by using injection tubes to pierce a septum separating the fluid fuel component from the second fuel component, and moving the injection tubes during injection by collapsing the container containing the fluid fuel component on (in) which the injection tubes are mounted. Other suitable fuels for use in the present invention are described herein.

Suitable known hydrogen generating apparatus are disclosed in PCT Application Publication Nos. WO 2005/036944 A2, published on Apr. 28, 2005, WO 2006/093735 A2, published on Sep. 8, 2006, WO 2006/138228 A2, published on Dec. 28, 2006, WO 2006/135896 A2, published on Dec. 21, 2006, and WO 2008/097849 A2, published on Aug. 14, 2008. The disclosure of these references is incorporated herein by reference in their entireties.

Figure 1A:
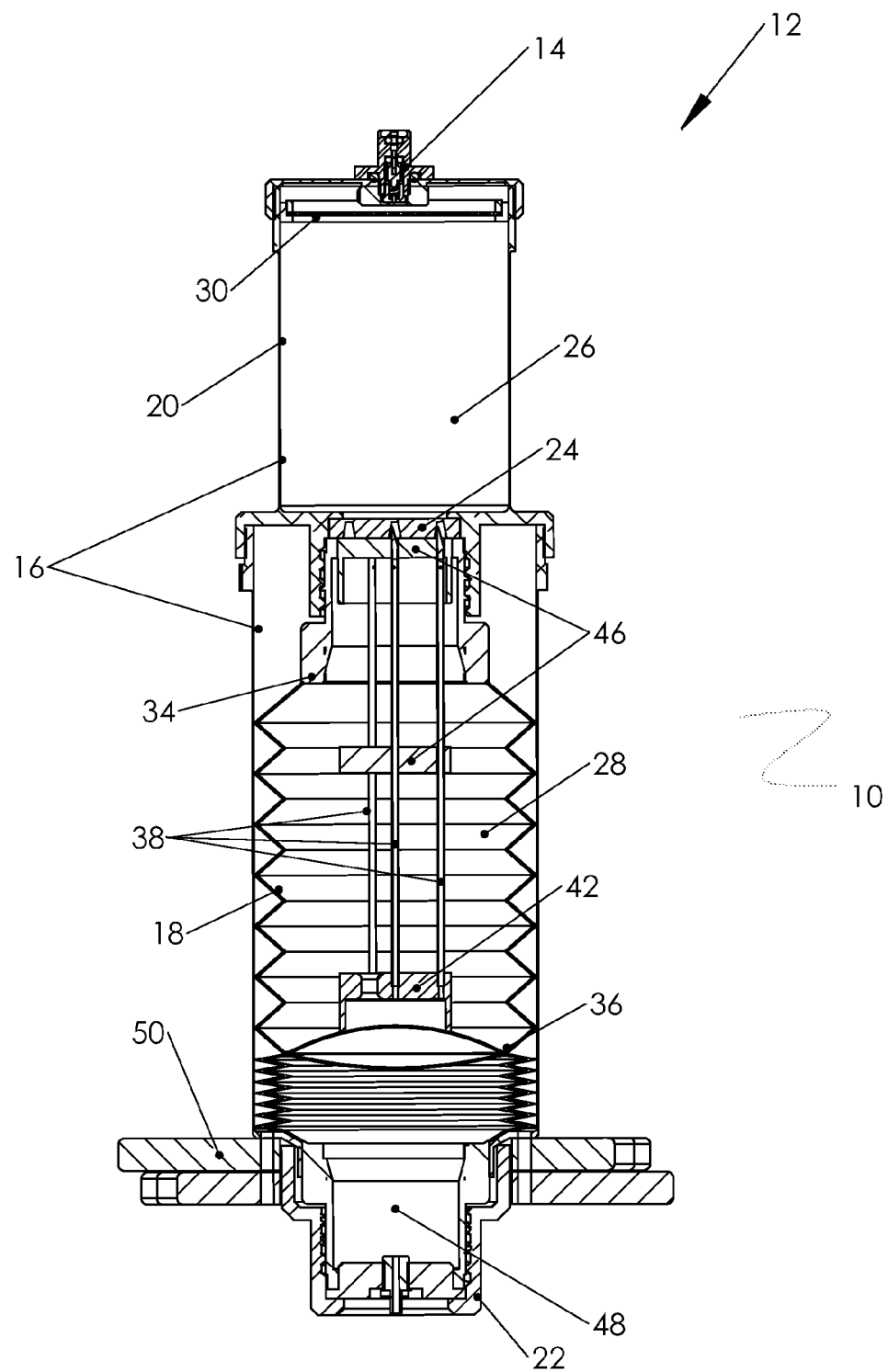
FIG. 1A is a cutaway side view of a fuel supply of the present invention.
Figure 1B:
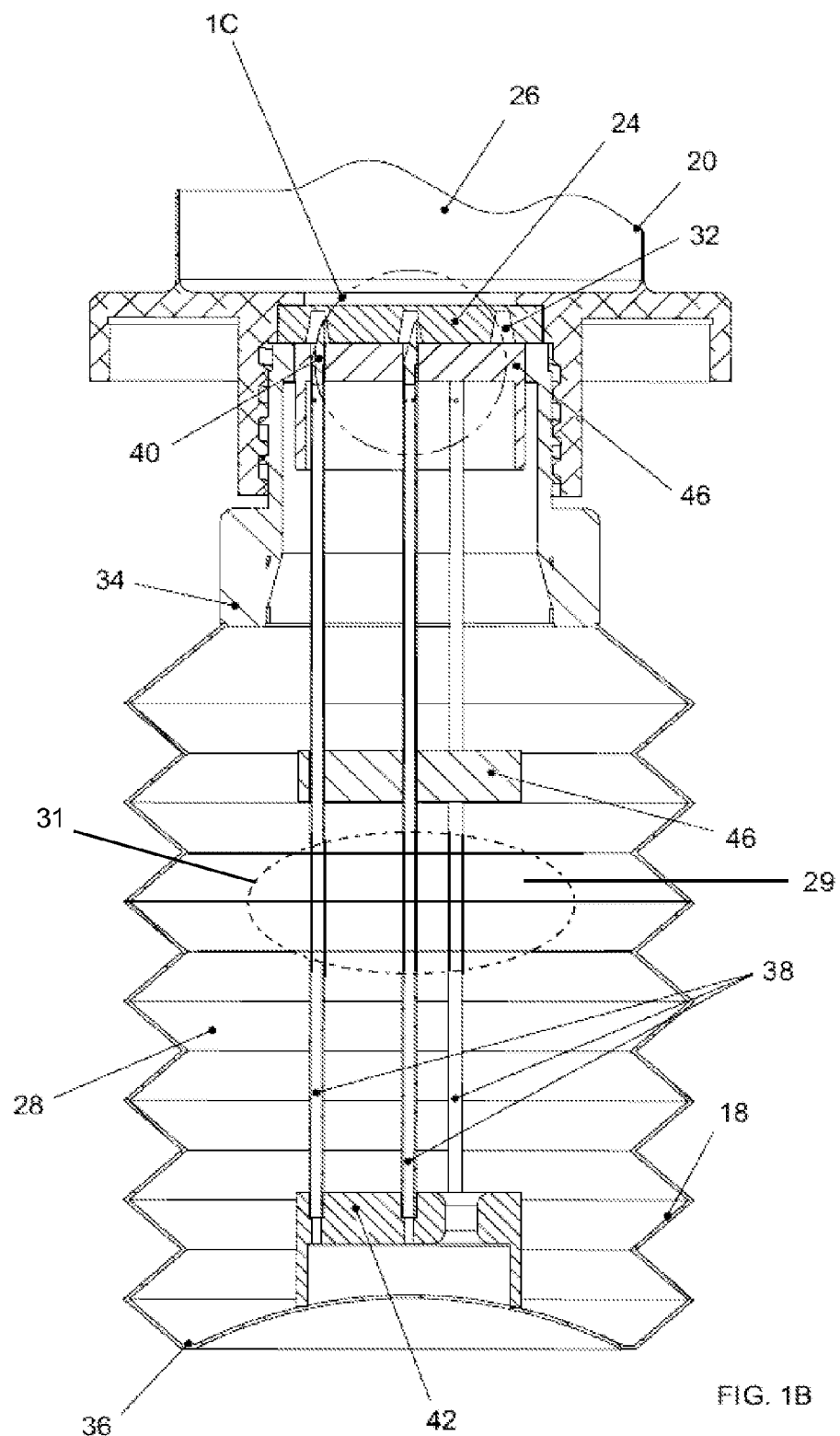
FIG. 1B is a cutaway side view of a portion of the fuel supply of FIG. 1A.
Figure 1C:
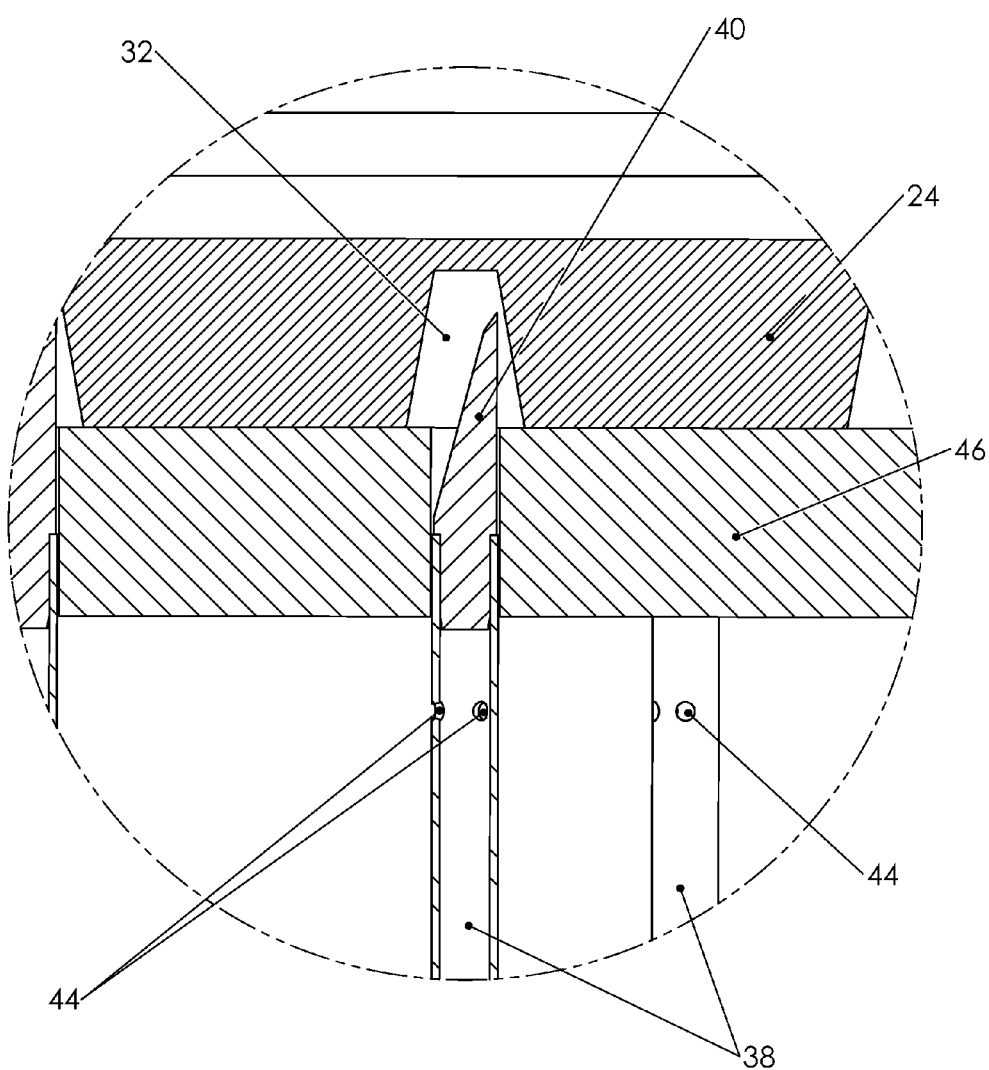
FIG. 1C is an enlarged cutaway side view of the inset A of FIG. 1B.

Referring to FIGS. 1A-1C, a fuel supply system 10 is shown. System 10 includes a gas-generating apparatus 12 and is configured to be connected to a fuel cell (not shown) via a valve 14 disposed on a housing 16 of gas generating apparatus 12. Housing 16 is preferably made of a fluid-impermeable material, such as stainless steel or plastic, and preferably encloses three distinct chambers: a fluid fuel reservoir 18; a reaction chamber 20; and a pressure chamber 22, wherein the reaction chamber 20 is separated from fluid fuel reservoir 18 by a septum 24, as seen in FIG. 1A. Valve 14 is preferably in fluid communication with reaction chamber 20, and may be any type of valve in the art, such as a pressure-opened, one-way valve, such as a check valve or a valve having a pressure responsive diaphragm, which opens when a threshold pressure is reached or can be any shut-off valve known in the art, including but not limited to, solenoid valve, etc., which may be opened manually by the user or by the controller controlling the fuel cell, or may be a combination of a pressure triggered valve and a shut-off valve.

Disposed within reaction chamber 20 is a solid fuel component 26. Solid fuel component 26 is preferably granular sodium borohydride ($NaBH_4$). However, tablets, grains, or other forms of solid material are also appropriate. Additional suitable solid fuel components are further discussed hereafter. Fillers, additives and other agents and chemicals can be added to solid fuel component 26 to improve its reaction with a fluid fuel component 28. When fluid fuel component 28 and solid fuel component 26 come into contact, they react to produce hydrogen, which may be transferred out of gas generating apparatus 12 to a fuel cell via valve 14.

A gas-permeable, liquid-impermeable membrane 30 may be affixed within reaction chamber 20 over the reaction chamber-facing side of valve 14 or may be disposed in valve 14. Alternatively, membrane 30 may be slidably or movably disposed within reaction chamber 20 by the expansion of the products of the reaction. Membrane 30 prevents liquids or byproducts from being transferred to the fuel cell via valve 14. Fillers or foams can be used in combination with membrane 30 to retain liquids or byproducts and to reduce clogging Membrane 30 may be formed from any liquid-impermeable, gas-permeable material known to one skilled in the art. Such materials can include, but are not limited to, hydrophobic materials having an alkane group. More specific examples include, but are not limited to: polyethylene compositions, polytetrafluoroethylene, polypropylene, polyglactin (VICRY®), lyophilized dura mater, or combinations thereof. Gas permeable membrane 30 may also comprise a gas-permeable, liquid-impermeable membrane covering a porous member. Examples of such membrane are CELGARD® and GORE-TEX®. Other gas-permeable, liquid-impermeable members usable in the present invention include, but are not limited to, SURBENT® Polyvinylidene Fluoride (PVDF) having a porous size of from about 0.1 $\mu$m to about 0.45 $\mu$m, available from Millipore Corporation. The pore size of SURBENT® PVDF regulates the amount of water exiting the system. Materials such as electronic vent type material having 0.2 $\mu$m hydro, available from W. L. Gore & Associates, Inc., may also be used in the present invention. Additionally, 0.25 inch diameter rods having a pore size of about 10 $\mu$m or 2 inch diameter discs with a thickness of about 0.3 $\mu$M available from GenPore, and sintered and/or ceramic porous material having a pore size of less than about 10 $\mu$M available from Applied Porous Technologies Inc. are also usable in the present invention. Furthermore, nanograss materials, from Bell Labs, are also usable to filter the liquid. Nanograss controls the behavior of tiny liquid droplets by applying electrical charges to specially engineered silicon surfaces that resemble blades of grass. Additionally, or alternatively, the gas-permeable, liquid-impermeable materials disclosed in PCT Application Publication No. WO 2004/068611 A2, published on Aug. 12, 2004, which is incorporated by reference herein, are also usable in the present invention.

Septum 24, best seen in FIGS. 1B and 1C, forms the boundary between reaction chamber 20 and reservoir 18. Septum 24 includes a substantially self-sealing membrane and is impermeable to fluid fuel component 28. Septum 24 may be made from any fluid impermeable material, and is preferably an elastomer or rubber. Septum 24 preferably includes notches or weakened section 32 allowing septum to be easily pierced.

Fluid fuel reservoir 18, best seen in FIG. 1B, preferably comprises a corrugated bladder or similar fluid container having a fixed end 34 and a movable end 36 movable from a first position toward the fixed end 34. Fluid fuel component 28, preferably water and/or an additive, resides within reservoir 18. Additional appropriate fluid fuel components are further discussed herein. Suitable additives to the fuels or reactants include, but are not limited to, anti-freezing agents (e.g. methanol, ethanol, propanol and other alcohols), catalysts (e.g. cobalt chloride and other known catalysts), pH adjusting agents (e.g., acids such as sulfuric acid or other common acids).

Also disposed in reservoir 18 are one or more fluid conduits 38. Fluid conduits 38 may take any shape, but preferably comprise a hollow needle structure. Fluid conduits 38 are capable of piercing septum 24 via a piercing end 40 to provide a fluid path for fluid fuel component 28 to access reaction chamber 20. Fluid conduits 38 are mounted on a base 42 attached to movable end 36 of fluid fuel reservoir 18, such that if movable end 36 moves, conduits 38 also move. Fluid conduits 38 are in fluid communication with fluid fuel component 28 and each fluid conduit 38 has one or more injection ports 44 comprised of a hollow tip of fluid conduit 38 at the piercing end 40 and/or holes laterally surrounding conduit 38 set back from piercing end 40, best seen in FIG. 1C. Washers 46 stabilize conduits 38 to ensure that conduits 38 do not bend when movable end 36 of reservoir 18 moves.

In a preferred embodiment, bubble or space 29 is provided within reservoir 18. Fluid fuel 28, e.g. water or methanol, is incompressible and at start-up it would be difficult to compress the liquid fuel within reservoir 18 to push conduits 38 to pierce septum 24. Bubble or space 29 is occupied by a gas, such as water vapor, methanol vapor, air, inert gas, etc. Gas is compressible and during start-up an initial start-up force can compress space 29 thereby compressing reservoir 18 to push conduit 38 through septum 24. Alternatively, the compressible gas within bubble or space 29 can be contained within an elastomeric member 31, such as a balloon, or a flexible liner 31.

Fluid fuel component 28 is pressurized, preferably by a pressurized gas or more preferably liquefied hydrocarbon 48 in pressure chamber 22, such as butane, propane, or isopropane which provides constant pressure to push fluid fuel component 28. Pressurized gas or liquefied hydrocarbon 48 actuates the movement of movable end 36 toward fixed end 34. Pressurized gas or liquefied hydrocarbon 48 may be replaced by a spring, which may be any appropriate spring known in the art.

Prior to startup, a stop 50 restricts pressure chamber 22 such that movable end 36 of reservoir 18 stays at the first position, similar to the configuration shown in FIG. 1A, and is not pushed by pressure chamber 22. In one embodiment, seen in FIG. 2, stop 50 comprises a net 52 and washers 54. Net 52 extends around pressure chamber 22 and restricts its expansion such that pressure chamber 22 cannot push against movable end 36 of reservoir 18. When washers 54 are rotated relative to each other, net 52 is cut or released such that it no longer restricts the expansion of pressure chamber 22, allowing pressure chamber 22 to expand and push against reservoir 18. In an alternative embodiment, stop 50 may be any other type of stop known in the art, and may include a rotatably engaged mechanical stop, or may include a removable pin or a pull-tab. When hydrogen gas is needed by the fuel cell, stop 50 is released, preferably by rotating stop 50 or washers 54 or by removing a pull-tab, and valve 14 is opened.

Pressurized gas or liquefied hydrocarbon 48 in pressure chamber 22 pushes movable end 36 of reservoir 18 toward fixed end 34, pushing base 42 and attached fuel conduits 38 toward reaction chamber 20. As fluid conduits 38 are pushed, piercing ends 40 of conduits 38 pierce septum 24 and piercing end 40 and injection ports 44 pass through septum 24 into reaction chamber 20. As movable end 36 of reservoir 18 moves toward fixed end 34, the volume of reservoir 18 decreases, forcing fluid fuel component 28 through the fluid flow path 38 and into reaction chamber 20, such that fluid fuel component 28 comes into contact with solid fuel component 26 and reacts to produce hydrogen. As base 42 and movable end 36 are pushed toward fixed end 34, fluid conduits 38 are pushed further into reaction chamber 20. This moves injection ports 44 further into reaction chamber 20, and causes liquid fuel component 28 to be introduced to fresh solid fuel component 26 at different locations. Exposing new sections of solid fuel component 26 to liquid fuel component 28 in this manner ensures that substantially all of solid fuel component 26 is reacted with fluid fuel component 28.

In an alternative embodiment, check valves or flapper valves are disposed within conduits 38 that shut off at a predetermined pressure level in reaction chamber 20, so that when the pressure in chamber 20 exceeds this level, the valves shut off the flow of fluid fuel component 28.

Some examples of the fuels that are used in the present invention include, but are not limited to, hydrides of elements of Groups IA-IVA of the Periodic Table of Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, calcium hydride, and salts and/or derivatives thereof. The preferred hydrides are sodium borohydride, magnesium borohydride, lithium borohydride, and potassium borohydride. Preferably, the hydrogen-bearing fuel comprises the solid form of $NaBH_4$, $Mg(BH_4)_2$, or methanol clathrate compound (MCC) is a solid which includes methanol. In solid form, $NaBH_4$ does not hydrolyze in the absence of water and therefore improves shelf life of the cartridge. However, the aqueous form of hydrogen-bearing fuel, such as aqueous $NaBH_4$, can also be utilized in the present invention. When an aqueous form of $NaBH_4$ is utilized, the chamber containing the aqueous $NaBH_4$ also includes a stabilizer. Exemplary stabilizers can include, but are not limited to, metals and metal hydroxides, such as alkali metal hydroxides. Examples of such stabilizers are described in U.S. Pat. No. 6,683,025, which is incorporated by reference herein in its entirety. Preferably, the stabilizer is NaOH.

The solid form of the hydrogen-bearing fuel is preferred over the liquid form. In general, solid fuels are more advantageous than liquid fuels because the liquid fuels contain proportionally less energy than the solid fuels and the liquid fuels are less stable than the counterpart solid fuels. Accordingly, the most preferred fuel for the present invention is powdered or agglomerated powder sodium borohydride.

According to the present invention, the fluid fuel component preferably is capable of reacting with a hydrogen-bearing solid fuel component in the presence of an optional catalyst to generate hydrogen. Preferably, the fluid fuel component includes, but is not limited to, water, alcohols, and/or dilute acids. The most common source of fluid fuel component is water. As indicated above and in the formulation below, water may react with a hydrogen-bearing fuel, such as $NaBH_4$ in the presence of an optional catalyst to generate hydrogen.

$$X(BH_4)_y + 2H_2O \rightarrow X(BO)_2 + 4H_2$$

Where X includes, but is not limited to, Na, Mg, Li and all alkaline metals, and y is an integer.

Fluid fuel component also includes optional additives that reduce or increase the pH of the solution. The pH of fluid fuel component can be used to determine the speed at which hydrogen is produced. For example, additives that reduce the pH of fluid fuel component result in a higher rate of hydrogen generation. Such additives include, but are not limited to, acids, such as acetic acid and sulfuric acid. Conversely, additives that raise the pH can lower the reaction rate to the point where almost no hydrogen evolves. The solution of the present invention can have any pH value less than 7, such as a pH of from about 1 to about 6 and, preferably, from about 3 to about 5.

In some exemplary embodiments, fluid fuel component includes a catalyst that can initiate and/or facilitate the production of hydrogen gas by increasing the rate at which fluid fuel component reacts with a fuel component. The catalyst of these exemplary embodiments includes any shape or size that is capable of promoting the desired reaction. For example, the catalyst may be small enough to form a powder or it may be as large as the reaction chamber, depending on the desired surface area of the catalyst. In some exemplary embodiments, the catalyst is a catalyst bed. The catalyst may be located inside the reaction chamber or proximate to the reaction chamber, as long as at least one of either fluid fuel component or the solid fuel component comes into contact with the catalyst.

The catalyst of the present invention may include one or more transitional metals from Group VIIIB of the Periodic Table of Elements. For example, the catalyst may include transitional metals such as iron (Fe), cobalt (Co), nickel (Ni), ruthenium (Ru), rhodium (Rh), platinum (Pt), palladium (Pd), osmium (Os) and iridium (Ir). Additionally, transitional metals in Group IB, i.e., copper (Cu), silver (Ag) and gold (Au), and in Group IIB, i.e., zinc (Zn), cadmium (Cd) and mercury (Hg), may also be used in the catalyst of the present invention. The catalyst may also include other transitional metals including, but not limited to, scandium (Sc), titanium (Ti), vanadium (V), chromium (Cr) and manganese (Mn). Transition metal catalysts useful in the present invention are described in U.S. Pat. No. 5,804,329, which is incorporated by reference herein in its entirety. The preferred catalyst of the present invention is $CoCl_2$.

Some of the catalysts of the present invention can generically be defined by the following formula:

$$M_aX_b$$

wherein M is the cation of the transition metal, X is the anion, and "a" and "b" are integers from 1 to 6 as needed to balance the charges of the transition metal complex.

Suitable cations of the transitional metals include, but are not limited to, iron (II) ($Fe^{2+}$), iron (III) ($Fe^{3+}$), cobalt ($Co^{2+}$), nickel (II) ($Ni^{2+}$), nickel (III) ($Ni^{3+}$), ruthenium (III) ($Ru^{3+}$), ruthenium (IV) ($Ru^{4+}$), ruthenium (V) ($Ru^{5+}$), ruthenium (VI) ($Ru^{6+}$), ruthenium (VIII) ($Ru^{8+}$), rhodium (III) ($Rh^{3+}$), rhodium (IV) ($Rh^{4+}$), rhodium (VI) ($Rh^{6+}$), palladium ($Pd^{2+}$), osmium (III) ($Os^{3+}$), osmium (IV) ($Os^{4+}$), osmium (V) ($Os^{5+}$), osmium (VI) ($Os^{6+}$), osmium ($Os^{8+}$), iridium (III) ($Ir^{3+}$), iridium (IV) ($Ir^{4+}$), indium (VI) ($Ir^{6+}$), platinum (II) ($Pt^{2+}$), platinum (III) ($Pt^{3+}$), platinum (IV) ($Pt^{4+}$), platinum (VI) ($Pt^{6+}$), copper (I) ($Cu^+$), copper (II) ($Cu^{2+}$), silver (I) ($Ag^+$), silver (II) ($Ag^{2+}$), gold (I) ($Au^+$), gold (III) ($Au^{3+}$), zinc ($Zn^{2+}$), cadmium ($Cd^{2+}$), mercury (I) ($Hg^+$), mercury (II) ($Hg^{2+}$), and the like.

Suitable anions include, but are not limited to, hydride ($H^-$), fluoride ($F^-$), chloride ($Cl^-$), bromide ($Br^-$), iodide ($I^-$), oxide ($O^{2-}$), sulfide ($S^{2-}$), nitride ($N^{3-}$), phosphide ($P^{4-}$), hypochlorite ($ClO^-$), chlorite ($ClO_2^-$), chlorate ($ClO_3^-$), perchlorate ($ClO_4^-$), sulfite ($SO_3^{2-}$), sulfate ($SO_4^{2-}$), hydrogen sulfate ($HSO_4^-$), hydroxide ($OH^-$), cyanide ($CN^-$), thiocyanate ($SCN^-$), cyanate ($OCN^-$), peroxide ($O_2^{2-}$), manganate ($MnO_4^{2-}$), permanganate ($MnO_4^-$), dichromate ($Cr_2O_7^{2-}$), carbonate ($CO_3^{2-}$), hydrogen carbonate ($HCO_3^-$), phosphate ($PO_4^{2-}$), hydrogen phosphate ($HPO_4^-$), dihydrogen phosphate ($H_2PO_4^-$), aluminate ($Al_2O_4^{2-}$), arsenate ($AsO_4^{3-}$), nitrate ($NO_3^-$), acetate ($CH_3COO^-$), oxalate ($C_2O_4^{2-}$), and the like. A preferred catalyst is cobalt chloride.

In some exemplary embodiments, the optional additive, which is in fluid fuel component and/or in the reaction chamber, is any composition that is capable of substantially preventing the freezing of or reducing the freezing point of fluid fuel component and/or solid fuel component. In some exemplary embodiments, the additive can be an alcohol-based composition, such as an anti-freezing agent. Preferably, the additive of the present invention is $CH_3OH$. However, as stated above, any additive capable of reducing the freezing point of fluid fuel component and/or solid fuel component may be used.

While it is apparent that the illustrative embodiment of the invention disclosed herein fulfills the objectives of the present invention, it is appreciated that numerous modifications and other embodiments may be devised by those skilled in the art. For example, the valve described herein may be triggered by an electronic controller such as a microprocessor. Therefore, it will be understood that the appended claims are intended to cover all such modifications and embodiments, which would come within the spirit and scope of the present invention. All publications discussed herein, including but not limited to patents, patent applications, articles, and books, are incorporated by reference in their entireties.

We claim:

1. A gas-generating apparatus (12) comprising:
    a first fuel container (18) containing a fluid fuel component (28) and a space (29) containing a compressible gas;
    a second fuel container (20) separated from the first fuel container by a divider (24), wherein the second fuel container contains a second fuel component (26), wherein the fluid fuel component reacts with the second fuel component to produce a gas;
    at least one fluid conduit (38) disposed at least partially within the first fuel container, wherein the at least one fluid conduit pierces the divider to form a fluid flow path for introducing the fluid fuel component into the second fuel component, where the at least one fluid conduit is movable, and wherein movement of the at least one fluid conduit allows the fluid fuel component to be introduced into a plurality of locations within the second fuel component,
    wherein the first fuel container comprises a fixed end (34) and a movable end (36), and wherein the at least one fluid conduit is attached to the movable end of the first fuel container.

2. The gas-generating apparatus of claim 1, wherein the first fuel container comprises a corrugated bladder.

3. The gas-generating apparatus of claim 1, wherein the initial movement of the at least one fluid conduit is actuated by a pressure on the first fuel container to compress space (29).

4. The gas-generating apparatus of claim 1, wherein the at least one fluid conduit comprises a hollow needle.

5. The gas-generating apparatus of claim 1, wherein the at least one fluid conduit (38) comprises at least one injection port (44), and wherein the fluid flow path passes through the at least one injection port.

6. The gas-generating apparatus of claim 5, wherein the at least one injection port is on a side of the at least one fluid conduit.

7. The gas-generating apparatus of claim 1, wherein the first fuel component is pressurized.

8. The gas-generating apparatus of claim 7, wherein the first fuel component is pressurized by a compressed gas (48).

9. The gas-generating apparatus of claim 7, wherein the first fuel component is pressurized by a liquefied hydrocarbon (48).

10. The gas-generating apparatus of claim 1, wherein a stop (50) initially blocks the movement of the at least one fluid conduit.

11. The gas-generating apparatus of claim 10, wherein the stop comprises a net (52).

12. The gas-generating apparatus of claim 10, wherein the stop comprises a pull-tab or a pin.

13. The gas-generating apparatus of claim 10, where the movement of the at least one conduit is unblocked by rotating a portion (52) of the gas-generating apparatus.

14. The gas-generating apparatus of claim 1, wherein the divider is a septum.

15. The gas generating apparatus of claim 1, wherein the at least one fluid conduit is disposed completely within the first fuel container.

16. The gas generating apparatus of claim 1, wherein the compressible gas is contained within an elastomeric or flexible member.

17. A starter mechanism for a gas generator having a first compartment isolated from a second compartment by a divider (24), wherein a liquid fuel precursor (28) in the first compartment is mixed with a solid fuel precursor (26) in the second compartment to produce a gas, said starter mechanism comprises
    an opening member (38) mounted on a movable base (42),
    a space (29) comprising a compressible gas and contained in the first compartment, and
    a stop (50) connected to the movable base (42), wherein the stop (50) comprises a release member,
    wherein in a first position where the liquid fuel precursor remains isolated from the solid fuel precursor the stop (50) prevents the movable base (42) from moving, and wherein in a second position the release member is activated and the space (29) is compressed to allow movable base (42) to move and the opening member (38) opens the divider (24) to allow the liquid fuel precursor (28) to mix with the solid fuel precursor (26); and wherein the opening member comprises at least one hollow needle (38).

18. The starter mechanism of claim 17, wherein the divider comprises a septum (24).

19. The starter mechanism of claim 17, wherein the divider comprises at least one weakened portion (32).

20. The starter mechanism of claim 17, wherein the first compartment is pressurized.

21. The starter mechanism of claim 17, wherein the release member comprises a rotatable member (54) and the release member is activated by a rotation of the rotatable member (54).

22. The starter mechanism of claim 17, wherein the release member comprises a pull-tab or a pin.

* * * * *